Jan. 30, 1968
W. MALLOFF
3,366,150
SAW CHAIN
Filed Aug. 9, 1965
2 Sheets-Sheet 1
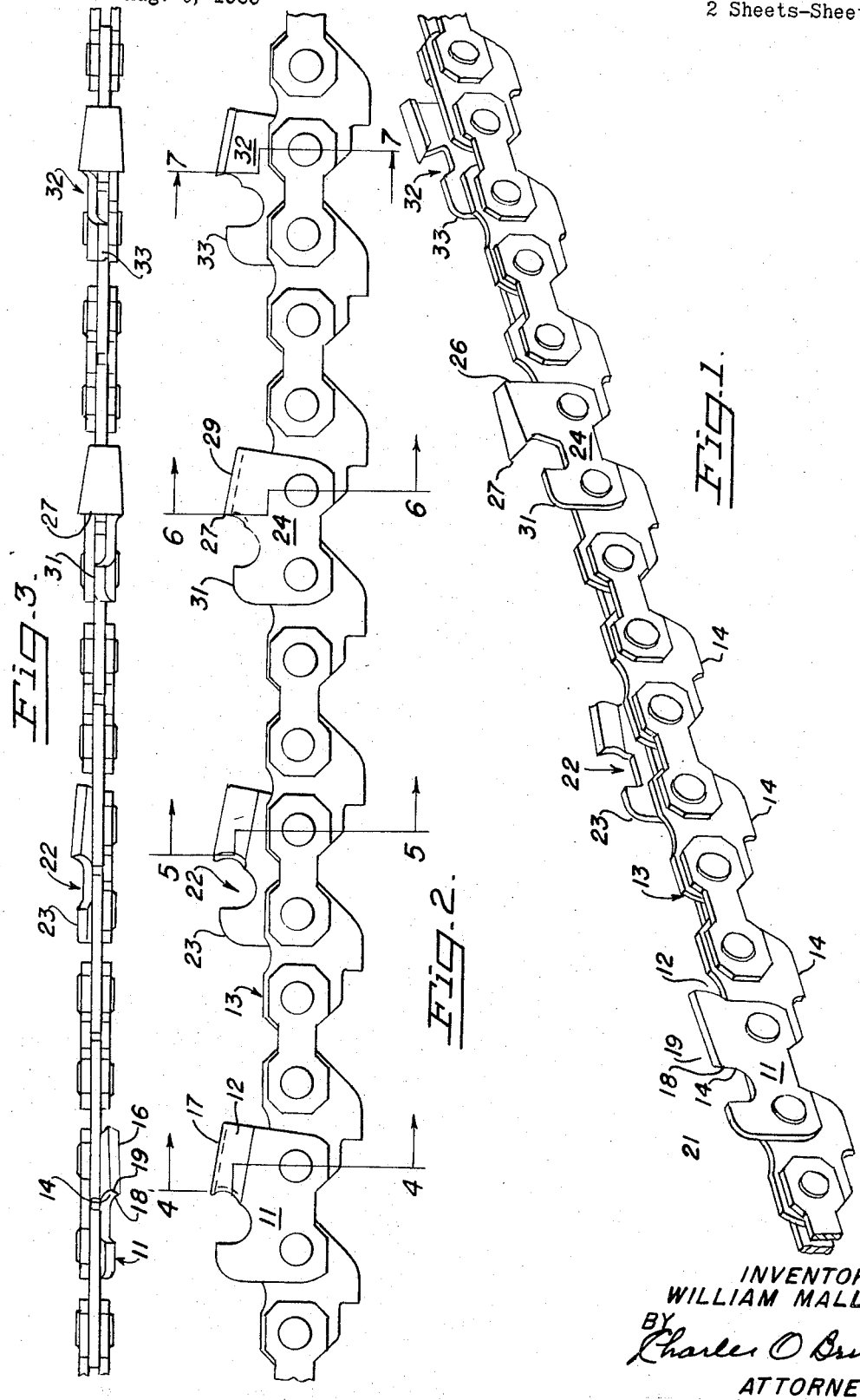
INVENTOR
WILLIAM MALLOFF
BY
Charles O Bruce
ATTORNEY Jan. 30, 1968

W. MALLOFF 3,366,150

SAW CHAIN

Filed Aug. 9, 1965

INVENTOR
WILLIAM MALLOFF
BY
Charles O. Bruce
ATTORNEY

United States Patent Office 3,366,150
Patented Jan. 30, 1968

3,366,150
SAW CHAIN
William Malloff, Caspar, Calif., assignor to Firmont Inc., a corporation of California
Filed Aug. 9, 1965, Ser. No. 478,198
6 Claims. (Cl. 143—135)

ABSTRACT OF THE DISCLOSURE

A saw chain providing in sequence a first scorer tooth followed by an oppositely extending scorer tooth followed by a raker tooth which is followed by a deeper cutting second raker tooth.

BACKGROUND OF THE INVENTION

Field of the invention

This application relates generally to saw chains. More particularly it relates to saw chains of the type which consist of a series of pivotally connected links which form cutting teeth and are power driven in a closed loop around the cutter bar of a chain saw.

Description of the prior art

Many saw chain cutting configurations have been devised, but heretofore each of these have contained certain undesirable characteristics which prevent efficient cutting action. Some saw chains provide cutting edges which effect a large lateral bite in the sides of the kerf (the kerf is the cut or incision made by a saw or other instrument). Usually the saw chains are designed so that the teeth alternate to cut laterally opposite from the one ahead or behind. A large lateral bite in a saw chain of this type causes excessive wobble, or side to side motion, in the tracking of the teeth, thereby preventing high speed operation. This condition also causes such severe loading of the pins and holes in the pivot joints that the chain life is seriously reduced. Other chain configurations provide teeth having compound curved cutting edges to cut the sides and bottom of the kerf simultaneously. These teeth are often difficult to sharpen. Even more undesirable is their inherent tendency to take an excessive bite due to the long cutting edge. This causes the teeth to drag through the cut and to bind along the edges, thereby reducing the cutting efficiency and requiring excessive power. In both of these designs the cutting edges tend to draw the teeth sideways whereby the chain saw does not track accurately along the kerf nor cut the side wood cleanly.

There exists in the art a need for an efficient saw chain; one which is equally effective when used for either crosscutting or ripping. Until recently, the largest consumer of chain saws was the lumbering industry where the primary need is for a cross-cutting chain saw for felling trees, pruning the limbs, and cutting the fallen and trimmed logs into lengths. Therefore, very little attention has been given to providing a ripping chain saw. Now chain saws are available in a large variety of sizes and for all sorts of uses. There exists a requirement for a chain saw which is very efficient as a crosscut saw, and equally efficient as a rip saw; one which tracks accurately with a smooth steady cutting condition for either type of cut.

Summary of the invention

In order to meet these requirements, the present invention utilizes a sequential cutting operation involving four separate cutting steps. Briefly the invention is a combination ripping and cross-cutting saw chain comprising a plurality of pivotally connected cutter links, a first cutter means extending outwardly and projecting laterally from the chain for cutting a first groove along one edge of the kerf; a second cutting means extending outwardly from the chain and projecting laterally opposite from the first cutting means and disposed to follow the first cutting means for cutting a second groove along the other edge of the kerf; the two cutting means formed to cut the edges of the kerf wide enough so that the rest of the chain may freely follow without touching the sides of the kerf; a third cutting means extending outwardly from the chain disposed to follow the second cutting means without touching the edges of the kerf and formed to remove approximately one-half the height of the ridge left between the grooves formed by the first and second cutting means; and a fourth cutting means extending outwardly from the chain for removing the remaining portion of the ridge.

It is therefore an important object of the present invention to provide a combination cross-cutting and ripping saw chain.

It is another object of the present invention to provide a saw chain which tracks accurately without wobble, and with low drag, for high speed operation and steady cutting conditions.

It is a further object of the present invention to provide a saw chain of high efficiency requiring less power consumption for the same cutting capacity as other saw chains.

It is still another object of the present invention to provide a saw chain in which all of the teeth can be easily sharpened by one file.

It is still a further object of the present invention to provide a saw chain in which only the cutting edges of the teeth engage the materail to be cut.

It is yet another object of the present invention to provide a saw chain which systematically removes the material being cut.

Additional objects of the invention will be brought out in the following description of a preferred embodiment of the same taken in conjunction with the accompanying drawings wherein:

Brief description of the drawings

FIGURE 1 is a perspective view of a saw chain of the present invention;

FIGURE 2 is a side view in elevation of the saw chain;

FIGURE 3 is a plan view of the saw chain;

Description of the preferred embodiment

Reference is made to the drawings for the details of the present invention in its preferred form. The combination ripping and cross-cutting saw chain illustrated is comprised of a plurality of pivotally connected links. Included are four cutter links which each perform an individual cutting operation in sequence. A complete chain saw will consist of a closed loop of many units of this series with a power drive.

Figure 4:
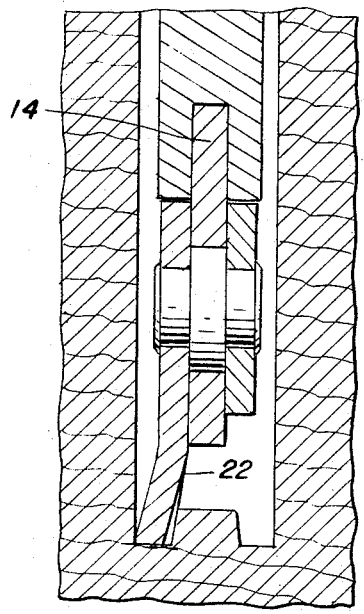
FIGURE 4 is a section view of the saw chain taken along lines 4—4.
Figure 5:
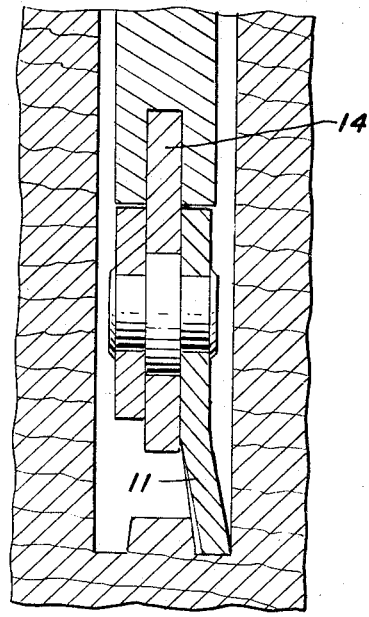
FIGURE 5 is a section view of the saw chain taken along the lines 6—6.

Referring to FIGURE 1, there shown in perspective is a section of the four basic links of the saw chain. The first link 11 has a rear portion 12 extending outwardly from the chain 13 (the outwardly direction is radial from the cutter bar in which the guide portions 14 of the saw chain ride and in the plane of the cutter bar). The rear portion of the link also projects laterally or sideways from the chain (laterally or sideways means a direction along the axes of the pivot pins of the saw chain). This can be seen from the plan view, FIGURE 3, or either of the section views FIGURES 4 and 5. The leading edge of this rear portion forms a first cutting edge 15. The rest of the rear portion is progressively recessed laterally along the side 16 away from the first cutting edge. This is best seen in the plan view, FIGURE 3. The rear portion also recedes inward along the foot 17 from the first cutting edge and is best seen from the side elevational, FIGURE 2.

The first cutting edge is self-feeding and cleanly cuts the side wood in the kerf. It has a side cutting portion 18 wherein the cutting face tapers laterally inward and rearward from the side portion. The cutting edge also has a bottom cutting portion 19 wherein the cutting edge tapers rearward and inward therefrom. The side and bottom cutting portions on the cutting edge coact to cut a relatively square cornered groove at the edge of the kerf. The first cutting edge is sharpenable by an unidirectional stroke of a round file, approximately at a 35° to 45° angle. This gives the cutting edge a very slight hook which effects the self-feeding action.

The first cutting edge is the cutting or scoring portion of the saw chain which cuts the side wood and determines the width of the kerf. The edge extends and projects from the chain sufficiently to cut a kerf wide enough so that the rest of the chain may freely follow without touching the sides formed thereby. The tooth is relatively thin and when cross-cutting it scores only; it does not rake out any material.

A forward portion of the first link extends outwardly from the chain and is disposed laterally within the edges of the kerf. This forms a depth gauge 21 that regulates the depth of cut effected by the first cutting edge. As the saw chain is drawn across the material, the gauge rides the bottom of the kerf and limits the depth to which the cutting edge can penetrate under its self feeding action. If a depth gauge is not used, the body portions of the links will limit the depth of penetration, but this causes a rough sawing motion, and effects high drag, thereby lowering the efficiency.

A second cutting link 22 is provided on the opposite side of the chain from said first link. This link is a tooth which is a mirror image of the first one, but it is important that the depth gauge 23 of this second link does not ride in the groove formed by the first cutter link. This second depth gauge is disposed laterally between the edges of the kerf, but it must be displaced from the groove path of the first cutting edge. In the present embodiment, both the first and second depth gauges are bent slightly inward from the edge of the chain toward the center of the kerf.

Figure 6:
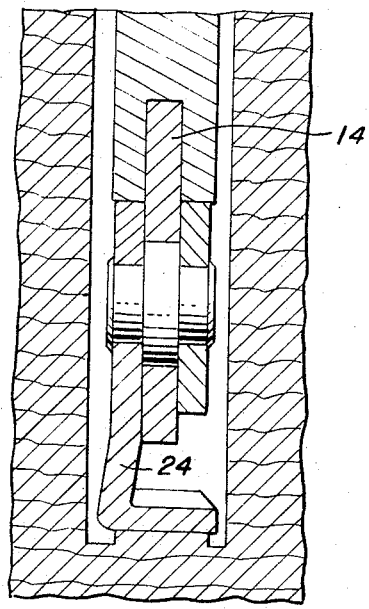
Figure 7:
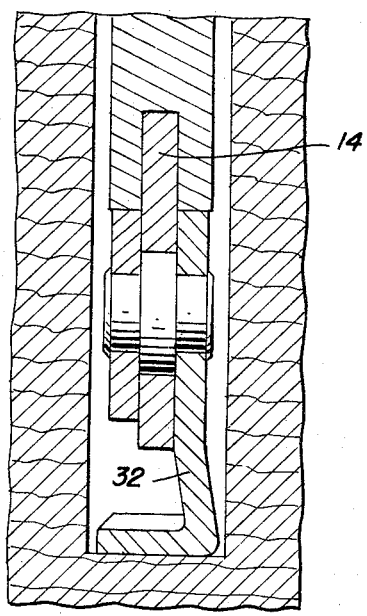
FIGURE 7 is a section view of the saw chain taken along line 7—7.

The third cutting link 24 of the saw chain has a rear portion 26 extending outwardly from the chain having a generally inverted L shaped cross section. This is most clearly illustrated by the cross section FIGURES 6 and 7. The forward edge of the rear portion forms a third cutting edge 27, called a raker, disposed perpendicular to the line of travel of the chain. The cutting edge tapers inward along the face. It can be formed and sharpened by a unidirectional stroke of the same file as used for forming and sharpening the first and second cutting edges. The third link rear portion tapers or narrows laterally along both sides 28 rearwardly of the third cutting edge. The cutting edge is wider than the closest edges of the groove paths formed by the first and second cutting edges so that it overlaps the grooves cut thereby, but it is narrower than the distance between the sides of the kerf so that it does not cut the side wood. This can best be seen from the plan view, FIGURE 3. The third link portion also recedes inward along the foot toward the chain rearward from the third cutting edge. This can best be seen from the side elevation, FIGURE 2. This tooth is bent over and cuts only with the sharpened top plate to take out the center ridge left by the scoring or first and second cutting edges.

A forward portion on the third link forms a third depth gauge 31 which is disposed to contact the kerf laterally between the groove paths formed by the preceding passage of the first and second cutting edges. This depth gauge effects a cut by the third cutting edge, or first raking tooth, which removes approximately one-half the height of the ridge left between the grooves. The depth gauge is tipped laterally to the middle of the chain so that it gauges the depth from the center of the kerf and prevents the gauge from sliding into the grooves cut by the leading cutters.

A fourth link 32 forms nearly a mirror image of the third link to rake out substantially what is left of the center ridge. It actually takes just a little less than the full remaining amount to insure that it does not dig into wood that has not been scored out.

There are many novel features and important advantages to be found in the present invention. The first and second cutting edges, or scorers, cut a kerf wide enough so that the chain may follow freely without touching the sides. This reduces friction and drag lessening the power required to drive the chain saw. It also lessens the strain on the rivets and pivot holes effecting longer life expectancy. The scorers, being thin, cut cleanly to their full depth. Since they do not remove the wood, or cut excessive side wood, unless they are ripping along the grain, the power requirements are further reduced. The form of all the cutting edges are single bevel to effect clean cuts without wedging into the material or forcing it apart. All of the cutting edge supporting structure tapers away from the cutting edge to prevent any frictional drag. The kerf is cut in sequence with each part of the operation efficiently carried out by an individual cutting edge. This provides a steady cutting condition and a chain which tracks accurately with little side motion or wobble. All of the cutting edges are simply formed and easily sharpened by a unidirectional stroke of a round file. The design has a further advantage in that the scoring teeth are easier to manufacture than a completely turned over tooth in that they can be formed by a simple blanking operation with a slight form. This permits lower manufacturing costs. All of these new and novel features effect an improvement in saw chains.

The most important feature of this saw chain is its ability to function either as a crosscut or rip saw. In crosscutting, the two leading teeth cut the side wood, crosscutting the grain, then the rakers come in and slice out the chips. This combination of scoring and raking takes less power because the scoring teeth are slim and cut faster and cleaner than the conventional type now used. When the chain saw is used for ripping, the two outside cutters, or first and second cutting edges, cut with the grain and act as cutters, rather than scorers, and remove the edges of the kerf. The rakers also become cutters and remove the center ridge. Each tooth cuts with the grain and thereby removes approximately one-fourth of the kerf, this reduces the strain one each tooth, and allows each to take a deeper bite, resulting in faster ripping action.

It will be apparent from the foregoing description of the invention, in its preferred form, that it will fulfill all the objects attributable thereto, while it has been illustrated and described in considerable detail, the protection is not to be limited to such details as have been illustrated and described except as may be necessitated by the appended claims.

I claim:

1. A combination ripping and cross-cutting saw chain comprising
 a first cutter means extending outwardly and projecting laterally from said chain for scoring a first groove along one edge of the kerf,
 a second cutting means extending outwardly from said chain and projecting laterally opposite from said first cutting means and disposed to follow said first cutting means for scoring a second groove along the other edge of the kerf, the two cutting means formed to cut the edges of the kerf wide enough so that the rest of the chain may freely follow without touching the sides of the kerf, a third cutting means extending outwardly from said chain disposed to follow said second cutting means without touching the edges of the kerf and formed to remove approximately one-half the height of the ridge left between said grooves formed by said first and second cutting means without substantial scoring of said ridge, and a fourth cutting means extending outwardly from said chain and formed to remove substantially the remaining portion of said ridge without substantial scoring of said ridge.

2. A combination ripping and cross-cutting saw chain comprising a first link portion forming a first groove cutting edge extending outwardly from said chain and projecting laterally beyond the following chain portions, a second link portion following said first link portion and forming a second groove cutting edge extending outwardly from said chain the same amount as said first cutting edge and projecting laterally opposite therefrom an amount equal to the lateral projection of said first cutting edge, a third link portion following said second link portion and forming a first raking cutter edge and formed to rake without scoring to a depth approximately equal to one-half the effective depth of cut of said first and second groove cutting edges, and a fourth link portion following said third link portion forming a second raking cutter edge and formed to rake without scoring to a depth substantially equal to the effective depth of cut of said groove cutting edges.

3. A combination ripping and cross-cutting saw chain comprising a plurality of pivotally connected links, a first link portion forming a first generally square cornered groove cutting edge extending outwardly from said chain and projecting laterally beyond the following chain portions, a second link portion forming a second generally square cornered groove cutting edge extending outwardly from said chain and projecting laterally opposite said first cutting edge beyond the following chain portions, a third link portion extending outwardly from said chain forming a first raking cutter edge for raking without scoring and having a width overlapping the cutting paths of said first and second groove cutting edges but less than the total width of cut to be effected, a first guide means for limiting the depth of cut of said third link portion to approximately one-half the depth of cut of said first and second link portions, a link portion extending outwardly from said chain forming a second raking cutter edge for raking without scoring and having a width equal to said first raking cutter edge, and a second guide means for limiting the depth of cut of said fourth link portion at least to the depth of cut of said first and second link portions.

4. A combination ripping and cross-cutting saw chain comprising a plurality of pivotally connected links including a link forming a first groove cutting edge extending outwardly from said chain and projecting laterally beyond the following chain portions, depth gauge means for controlling the depth of cut of said first cutting edge, a link forming a second groove cutting edge extending outwardly from said chain and projecting laterally opposite said first cutting edge beyond the following chain links, depth gauge means for controlling the depth of cut of said second cutting edge, links extending outwardly from said chain forming first and second raking cutter edges for raking without scoring and having widths overlapping the distance between the innermost edges but less than the distance between the outermost edges of said first and second groove cutting edges, depth gauge means for said first raking cutter edge to effect a depth of cut approximately equal to one-half the depth of cut of said groove cutting edges, and depth gauge means to effect a depth of cut for said second raking cutter edge substantially equal to the depth of cut of said groove cutting edges.

5. A combination ripping and cross-cutting saw chain comprising a plurality of pivotally connected links, a first link having a rear portion forming a first cutting edge extending outwardly from the chain and projecting laterally for cutting a relatively square cornered groove along one edge of the kerf, a forward portion on said first link forming a depth gauge means for controlling the depth of cut of said first cutting edge, a second link having a rear portion forming a second cutting edge extending outwardly from said chain the same distance as said first cutter edge and projecting laterally opposite said first edge for cutting a relatively square cornered groove similar to said first cutting edge along the other edge of the kerf, a forward portion on said second link forming a depth gauge means for controlling the depth of cut of said second cutting edge, a third link having a rear portion forming a first raking edge extending outwardly from said chain for raking without scoring, the width of said raking cutter greater than the effective distance between the inner edges of the groove cutters and less than the distance between the edges of the kerf, a forward portion on said third link forming a depth gauge means for effecting a depth of cut for said first raking edge approximately equal to one-half the depth of cut of said first and second cutting edges for removing one-half the height of the ridge left between the grooves cut by the first and second cutting edges, and a fourth link extending outwardly from said chain and having a rear portion forming a second raking edge the width of said first raking edge for raking without scoring, a forward portion on said fourth link forming a depth gauge means for effecting a depth of cut for said second raking edge substantially equal to the depth of cut of said first and second cutting edges for removing the rest of the ridge left between the grooves cut by the first and second edges and traversed by said third link portion.

6. A combination ripping and cross-cutting saw chain comprising a plurality of pivotally connected links, a first link having a rear portion extending outwardly and projecting laterally from said chain forming a first cutting edge, said rear portion recessed laterally along the side and receding inward along the foot from said first cutting edge, said cutting edge having a side cutting portion tapering laterally inward and rearward and a bottom cutting portion tapering inward and rearward, said cutting portions coacting to cut a relatively square corned groove at the edge of the kerf, said cutting edge sharpenable by a uni-axial stroke of a round file, a forward portion on said first link extending outwardly from said chain disposed laterally within the edges of said kerf forming a first depth gauge for said first cutting edge, a second link forming a mirror image of said first link, a third link having a rear portion extending outwardly from said chain of generally inverted "L" shaped cross section forming a third cutting edge disposed perpendicular to the longitudinal axis of said chain and tapering inward and rearward, said cutting edge being wider than the closest edges of the groove paths formed by the first and second cutting edges, but narrower than the distance between the sides of kerf, and capable of being sharpened by a uni-axial stroke of a round file, said third link rear portion tapering laterally rearward on both sides and receding inward along the foot from said third cutting edge, a forward portion on said third link extending outward from said chain forming a third depth gauge disposed laterally between the groove paths of said first and second cutting edges, the length of said gauge permitting said third cutting edge to remove approximately one-half the ridge left between the grooves cut by the first and second cutting edges, and a fourth link having a rear portion forming a fourth cutting edge the mirror image of said third link rear portion, and a forward portion extending outward from said chain forming a fourth depth gauge disposed laterally between the groove paths of said first and second cutting edges, the length of said gauge permitting said fourth cutting edge to remove the remaining ridge left by the third cutting edge between the grooves formed by the first and second cutting edges.

References Cited

UNITED STATES PATENTS

| | | | |
|---|---|---|---|
| 2,832,380 | 4/1958 | Crowe | 143—135.7 |
| 3,183,948 | 5/1965 | Carlton | 143—135 |

DONALD R. SCHRAN, *Primary Examiner.*